Figure 1:
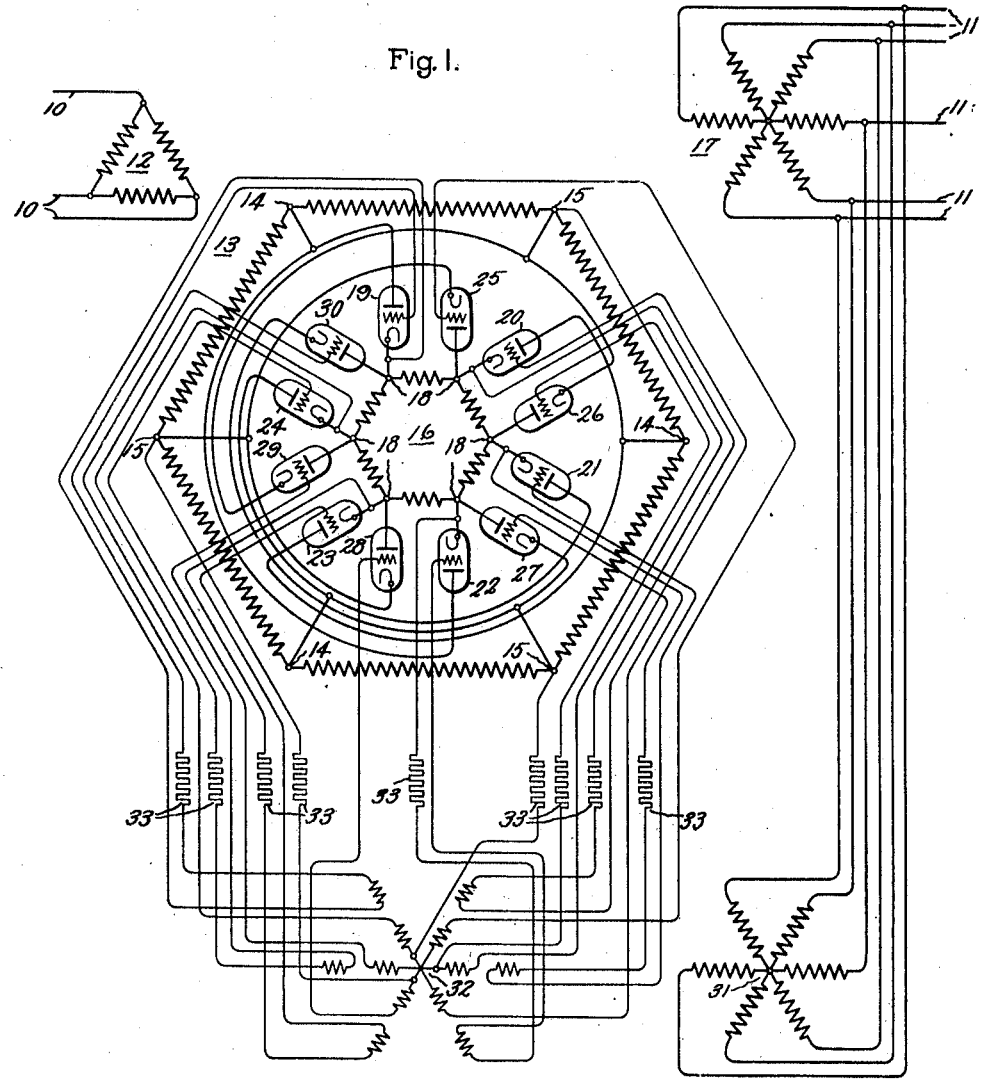

Oct. 10, 1933.    C. H. WILLIS    1,929,728
ELECTRIC VALVE CONVERTING APPARATUS
Filed Dec. 22, 1931    2 Sheets-Sheet 1

Inventor:
Clodius H. Willis,
by *Charles E. Tullar*
His Attorney.

Oct. 10, 1933.  C. H. WILLIS  1,929,728
ELECTRIC VALVE CONVERTING APPARATUS
Filed Dec. 22, 1931  2 Sheets-Sheet 2

Inventor:
Clodius H. Willis,
by Charles E. Mullan
His Attorney.

Patented Oct. 10, 1933

1,929,728

UNITED STATES PATENT OFFICE 1,929,728

ELECTRIC VALVE CONVERTING APPARATUS

Clodius H. Willis, Princeton, N. J., assignor to General Electric Company, a corporation of New York Application December 22, 1931
Serial No. 582,588

7 Claims. (Cl. 172—281)

My invention relates to electric valve converting apparatus and more particularly to such apparatus adapted to transmit energy between alternating current circuits of different frequencies.

Heretofore there have been devised numerous electric valve converting apparatus for transmitting energy between alternating current circuits of different frequencies. Such apparatus have usually comprised a plurality of electric valves for rectifying the alternating current supply and a plurality of other electric valves for inverting the rectified current to an alternating current of the desired frequency, in certain instances the same electric valves effecting both the rectifying and inverting operations. The use of valves of the vapor electric discharge type in such converting apparatus has been found particularly advantageous because of the relatively large amounts of power which may be handled at ordinarily operating voltages. The use of vapor electric discharge valves in certain apparatus of the prior art has introduced certain commutation difficulties, while in certain other of the arrangements of the prior art the potential of the low frequency circuit comprises a series of half cycles of the high frequency potential and thus has a somewhat undesirable wave form.

It is an object of my invention, therefore, to provide an improved electric power converting apparatus for transmitting energy between alternating current circuits of different frequencies which will overcome the above mentioned disadvantages of the arrangements of the prior art and which will be simple and reliable in operation.

It is another object of my invention to provide an improved electric valve converting apparatus for converting alternating current of a given frequency into alternating current of a lower frequency in which the current may be readily commutated between the several electric valves.

It is a further object of my invention to provide an improved electric valve converting apparatus for transmitting energy between alternating current circuits of different frequencies in which the wave form of the low frequency current will be substantially sinusoidal.

In accordance with one embodiment of my invention an alternating current supply circuit is interconnected with a load circuit comprising a polyphase inductive network through a plurality of electric valves preferably of the vapor electric discharge type. The load circuit has a greater number of phases than the supply circuit so that the electrical displacement between the phases of the supply circuit is greater than that of the load circuit. Adjacent electric valves interconnect adjacent phase terminals of the load circuit and the supply circuit so that the current, in transferring from one valve to the succeeding valve, traverses a greater phase angle with respect to the supply circuit than the load circuit and one complete cycle of the supply circuit corresponds to a fraction of a cycle of the load circuit with the result that the frequency of the current is reduced. In accordance with certain modifications of my invention special connections of electric valves are provided in cases where the number of phases of the load circuit is not an integral multiple of that of the supply circuit.

Figure 2:
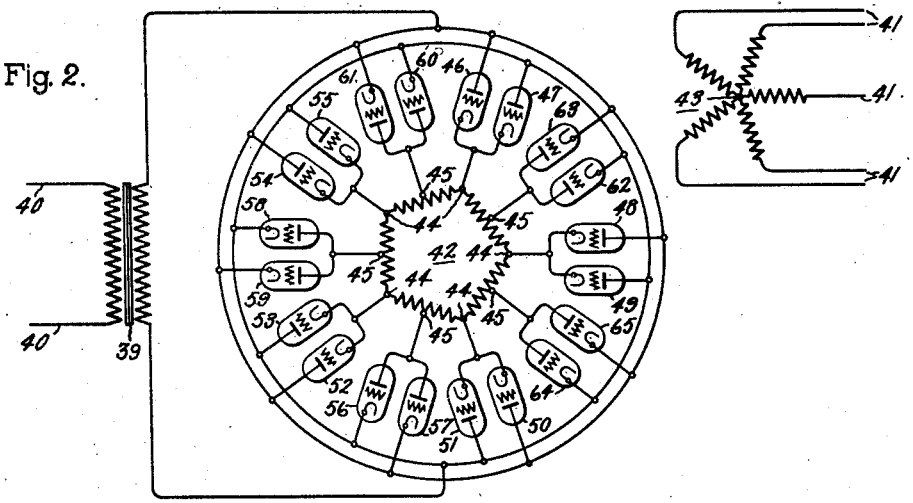
Figure 3:
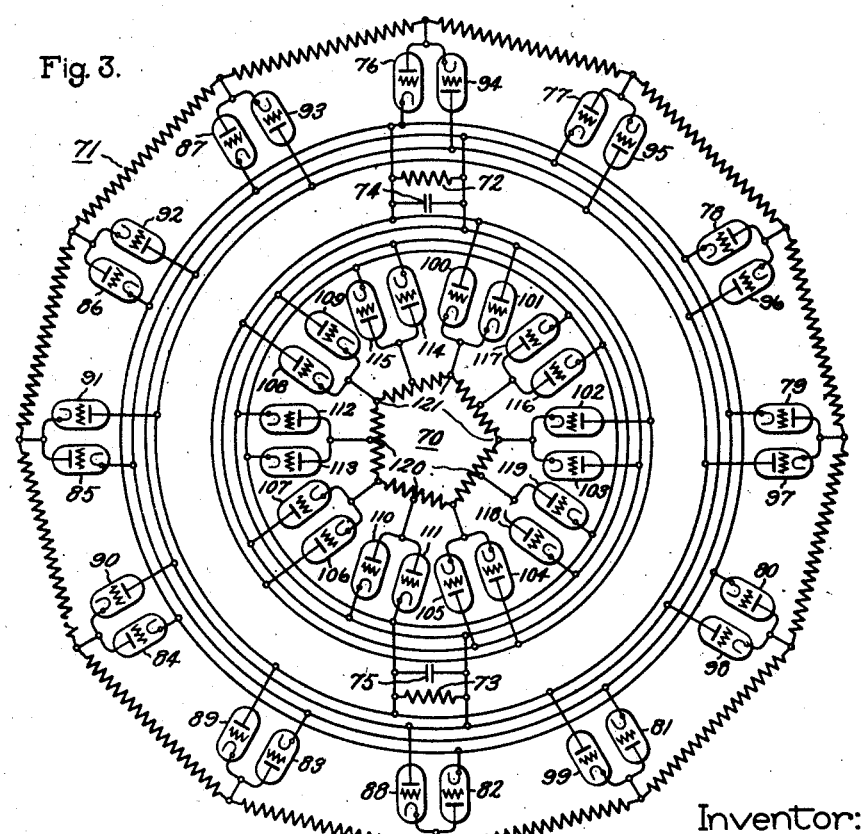

For a better understanding of my invention, together with other and further objects thereof, reference is had to the following description taken in connection with the accompanying drawings and its scope will be pointed out in the appended claims. Fig. 1 of the drawings illustrates an apparatus embodying my invention for transmitting energy from a three phase alternating current supply circuit to a six phase alternating current load circuit operating at a frequency one half that of the supply circuit; Fig. 2 shows an arrangement for transmitting energy from a single phase circuit to a five phase circuit in which the grid circuits of the several electric valves have been omitted for the sake of simplicity, while Fig. 3 illustrates an arrangement for transmitting energy from a five phase circuit to a twelve phase circuit.

Referring now to the drawings, there is shown in Fig. 1 an arrangement for transmitting energy from a three phase alternating current supply circuit 10 to a six phase alternating current circuit 11 operating at a frequency equal to half that of the supply circuit. This arrangement includes a transformer network comprising a three phase primary winding 12 connected to the circuit 10 and a polyphase secondary network 13 provided with positive terminals 14 and negative terminals 15. The network 13 is illustrated as a six phase connection in order that the positive and negative terminals may be diametrically opposite, although it will be obvious to those skilled in the art that a three phase network, each of the phases of which is provided with an electrical midpoint, is equally suitable. The arrangement also includes a polyphase transformer network comprising a six phase primary winding 16 and the six phase secondary network 17 connected to the alternating current load circuit 11. Adjacent positive terminals 14 of the network 13 are interconnected with adjacent terminals 18 of the network 16 through electric valves 19-24 inc., but, since there are twice as many terminals 18 as 14, each of the terminals 14 is connected to two terminals 18. For example one of the terminals 14 is interconnected through electric valves 19 and 22 with diametrically opposite terminals 18 of the winding 16. Similarly adjacent negative terminals 15 of the winding 13 are interconnected with adjacent terminals of the winding 16 through electric valves 25-30 inc., each negative terminal 15 opposite a particular positive terminal 14 being interconnected with the terminal 18 diametrically opposite the terminal 18 to which the corresponding terminal 14 is connected. Electric valves 19-30 inc., are each provided with an anode, a cathode, and a control grid and may be of any of the several types well known in the art, although I prefer to use valves of the vapor electric discharge type. In case the alternating current circuit 11 is connected to an independent source of electromotive force for determining its frequency at half that of the supply circuit 10, the grids of the several electric valves 19-30 inc., may be energized therefrom through a suitable grid transformer comprising a six phase primary network 31 and a six phase secondary network 32 consisting of a group or groups of insulated secondary windings for exciting the grids of the several electric valves having independent cathode potentials. As may be seen from Fig. 1 of the drawings, the connections are such that the positive electric valves 19-24 inc., and the corresponding diametrically opposite electric valves 25-30 inc., are successively rendered conductive at intervals of 60 electrical degrees as referred to the load circuit 11 or 120 electrical degrees as referred to the supply circuit. In case valves of the vapor electric discharge type are utilized, the grid transformer comprising the windings 31 and 32 should be self saturating or self saturating transformers should be interposed between the winding 32 and the several grids of the electric valves, or some other means should be provided for converting a sinusoidal grid excitation into one of peaked wave form, since each of the electric valves should be rendered conductive for a period somewhat less than 60 electrical degrees. However, this feature of supplying a vapor electric discharge valve with a periodic grid potential of peaked wave form comprises no part of my present invention but is disclosed and broadly claimed in a copending application of B. D. Bedford, Serial No. 485,335, filed September 29, 1930, and assigned to the same assignee as the present application. Current limiting resistors 33 are preferably included in the grid circuits of the several electric valves as indicated.

In the operation of the above described apparatus, it will be assumed that the circuit 11 is connected to an independent source of electromotive force of a frequency half that of the circuit 10, and that the two circuits are synchronized. Considering the instant when the maximum electromotive force of the network 13 is along the diameter connecting the upper positive terminal 14 and the lower negative terminal 15, current will flow from the network 13 through electric valve 19, the upper left hand terminal 18 of the network 16, through the network 16 and from the lower right hand terminal 18 thereof through electric valve 27 to the lower terminal 15 of the network 13. This current will flow for 120 electrical degrees referred to the supply circuit or 60 electrical degrees referred to the load circuit, when the potential of the right hand positive terminal 14 rises above that of the upper positive terminal 14 and the current is transferred from the valve 19 to the valve 20 and from the valve 27 to the valve 28. It is seen that the axis of conduction has advanced 120 electrical degrees with respect to the supply circuit but only 60 electrical degrees with respect to the load circuit. In this manner the current is successively transferred between the several adjacent valves, the axis of conduction making two complete revolutions of the network 13 for each revolution of the network 16. Thus energy is supplied to the load circuit 11 at a frequency half that of supply circuit 10. While I have illustrated the grids of the several electric valves as being energized from the alternating current load circuit 11, it will be obvious to those skilled in the art that, in case the circuit 11 is not connected to an independent source of electromotive force, the grids of the several electric valves may be energized from the alternating current supply circuit 10 through any suitable frequency changing apparatus.

In Fig. 2 there is illustrated an extension of my invention to an arrangement in which the number of phases of the load circuit is not an integral multiple of the number of phases of the supply circuit, and in which the conventional single phase system is considered as having two phases in that the potentials of the two opposite terminals are displaced in phase 180 electrical degrees. In this figure there is shown an arrangement for transmitting energy between a single phase alternating current supply circuit 40 and a five phase alternating current load circuit 41. This apparatus includes a transformer comprising a five phase ring connected primary network 42 and a five phase star connected secondary network 43 connected to the alternating current circuit 41 and a single phase transformer 39 provided with a primary winding connected to the supply circuit 40 and a secondary winding adapted to energize the primary network 42 of the output transformer. In this arrangement the number of phase terminals of the network 42 is not an integral multiple of the number of phase terminals of the transformer 39 so that the axis of conduction of the network 42 must rotate through more than one revolution in order to return to the starting point; that is, to the point at which a particular phase terminal of the supply circuit is connected to the same phase terminal of the load circuit through the same electric valve. It can thus be shown that the number of valves required is equal to the least common multiple of the number of phases of the supply and load circuit for a half wave arrangement or twice that number for a full wave arrangement as illustrated in Fig. 2. In this arrangement, each of the several positive terminal 44 of the inductive network 42 are interconnected with the secondary winding of the transformer 39 through electric valves 46—55 inc., each terminal 44 being connected to both terminals of the secondary winding of transformer 39 through a pair of similarly disposed electric valves. Each of the negative terminals 45 of the conductive network 42 is similarly connected to the terminals of the secondary winding of transformer 39 through electric valves 56—65 inc. In the operation of this system, one valve connected to each terminal is operative during its respective portion of alternate cycles of the low frequency circuit, while the other valve is operative during its respective portion of the other cycle. For example, the order in which the valves are rendered conductive is: 46—56, 49—59, 50—60, 53—63, 54—64, 47—57, 48—58, 51—61, 52—62, 55—65, 46—56, etc. For the sake of simplicity, the grids circuits have been omitted from this figure, but it will be obvious to those skilled in the art that any suitable grid control arrangement may be used for rendering the valves conductive in this order.

In Fig. 3, there is shown a somewhat simplified arrangement for transmitting energy from a five phase alternating current supply circuit to a twelve phase alternating current load circuit. According to the arrangement of Fig. 2, the least common multiple of the phases of the supply and load circuits is 60 so that 120 electric valves would be required for full wave operation. By the simplified arrangement in Fig. 3, however, this number is reduced to 44. The five phase ring connected winding 70 represents the secondary transformer network of the supply circuit, the primary network of which has been omitted for the sake of simplicity, while the network 71 corresponds to the primary network of the load circuit the secondary network of which has similarly been omitted. A plurality of electric valves 76–87 inc., are similarly connected to the several phase terminals of the network 71, while a plurality of other electric valves 88–99 inc., are oppositely connected to diametrically opposite phase terminals, respectively, of the same network. Electric valves 100–109 inc., are associated with the network 70, two of these valves being similarly connected to each phase terminal as in the arrangement of Fig. 2. Similarly, a plurality of other electric valves 110–119 inc., are associated with intermediate terminals of the several phase windings in order to provide a diametrical axis of conduction as in the arrangement of Fig. 2, two of each of these valves being similarly connected to each intermediate phase terminal. In order to interconnect the networks 70 and 71, there are provided commutating reactors 72 and 73, across which may be connected capacitors 74 and 75, respectively, although in some instances these capacitors may be omitted. Each terminal of reactor 72 is connected to the valves of the group 76–87 inc., associated with alternate phase terminals of the network 71. Each terminal of this reactor is also connected to one of the group of electric valves 100–109 inc., associated with each phase terminal of the network 70. Similarly, each terminal of the reactor 73 is connected to valves of the oppositely disposed group 88–99, inc., associated with alternate phase terminals of the network 71 and one valve of the group 110–119 inc., associated with each intermediate phase terminal of the network 70. In this arrangement the several electric valves are rendered conductive at the frequency of their associated network and with a phase displacement equal to the phase displacement between their connections. For example, the electric valves associated with the network 71 are rendered conductive in the order 76—88, 77—89, 78—90, etc., at time intervals of thirty electrical degrees referred to the network 71 and, similarly, electric valves associated with the network 70 are rendered conductive in the order 100—110, 102—112, 104—114, etc.

In considering the operation of the apparatus illustrated in Fig. 3, it will be assumed that initially the axis of maximum potential of the network 70 is between the upper terminal 121 and the lower intermediate terminal 120 and that the latter is positive with respect to the terminal 121. It will also be assumed that electric valves 111, 88, 76 and 101 are conductive at this instant. Current will then flow through the path including these valves and commutating reactors 73 and 72. During the interval of current flow through this path condensers 75 and 74 will become charged with a potential equal to the reactance drop in reactors 73 and 72 respectively. Seventy-two electrical degrees later with respect to the supply circuit and thirty degrees later with respect to the load circuit electric valves 112, 89, 77 and 102 are rendered conductive. It will be seen that the potentials across condensers 75 and 74 are of such a polarity as to aid in commutating the current between electric valves 88 and 89 and 76 and 77, respectively. In this manner the current is successively transferred between the valves associated with adjacent terminals of the networks 70 and 71, the axis of the conduction of the network 71 completing only $\frac{1}{12}$ of a revolution for each revolution of the axis conduction of the network 70. For such an arrangement it will be found that the cycle of conductivity of the several electric valves repeats itself each 60 operations, that is, every five cycles referred to the load circuit 71 and every twelve cycles referred to the supply network 70.

While I have illustrated my invention as embodied in arrangements for transmitting energy between circuits of specific number of phases, it will be apparent to those skilled in the art that it is equally applicable to transmission of energy between any $n$-phase system and an $m$-phase load circuit in which the frequency of the load circuit is $n/m$ times that of the supply circuit. It will also be apparent that, while I have illustrated the invention as applied to full wave converting apparatus, it is equally applicable to half wave valve converting apparatus, in which the number of electric valves required is one half as great and in which the electrical neutrals of the supply and load circuits are directly interconnected.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

1. An electric valve frequency changing system comprising an alternating current supply circuit, an alternating current load circuit including a polyphase inductive network, said load circuit being adapted to operate at a frequency which is a submultiple of that of said supply circuit, and an electric valve interconnecting each terminal of said inductive network with a point in said supply circuit, the phase displacement between connections of adjacent valves to said supply circuit being a multiple of the phase displacement between said connections to said inductive network.

2. An electric valve frequency changing system comprising an $n$-phase alternating current supply circuit, an alternating current load circuit including an $m$-phase inductive network, where $m$ is greater than $n$, and means for supplying energy to said load circuit at a frequency which is $n/m$ times that of said supply circuit including an electric valve interconnecting each terminal of said network with a point in said supply circuit, the phase displacements between the connections of adjacent valves to said network and said supply circuit being in the ratio of $n/m$ respectively.

3. An electric valve frequency changing system comprising an $n$-phase alternating current supply circuit, an $m$-phase alternating current load circuit, where $m$ is greater than $n$, and means for supplying energy to said load circuit at a frequency which is $n/m$ times that of said supply circuit including an electric valve interconnecting each phase of said load circuit to a point in said supply circuit, the connections of adjacent valves to said supply circuit being displaced by one phase thereof.

4. An electric valve frequency changing system comprising an $n$-phase alternating current supply circuit, an $m$-phase alternating current load circuit, where $m$ is greater than $n$, and means for supplying energy to said load circuit at a frequency which is $n/m$ times that of said supply circuit including an electric valve interconnecting each phase of said load circuit to a point in said supply circuit, the connections of adjacent valves to said supply circuit being displaced by one phase thereof, and means for successively rendering said valves conductive at the frequency of said load circuit.

5. An electric valve frequency changing system comprising an $n$-phase alternating current supply circuit, an $m$-phase alternating current load circuit, where $m$ is greater than $n$ but a non-integral multiple thereof, and means for supplying energy to said load circuit at a frequency which is $n/m$ times that of said supply circuit including a plurality of electric valves equal in number to the least common multiple of $n$ and $m$, corresponding adjacent valves interconnecting adjacent terminals of said supply and load circuits.

6. An electric valve frequency changing system comprising an $n$-phase alternating current supply circuit, a $m$-phase alternating current load circuit, and means for supplying energy to said load circuit at a frequency which is $n/m$ times that of said supply circuit including $n$ electric valves connected to the several phases of said supply circuit, $m$ electric valves connected to the several phases of said load circuit, and a commutating device having a pair of terminals each connected to one terminal of each of said valves associated with alternate phases of said supply and load circuits.

7. An electric valve frequency changing system comprising an $n$-phase alternating current supply circuit, an $m$-phase alternating current load circuit, and means for supplying energy to said load circuit at a frequency which is $n/m$ times that of said supply circuit including $n$ electric valves connected to the several phases of said supply circuit, $m$ electric valves connected to the several phases of said load circuit, and a reactance having a pair of terminals each connected to one terminal of each of said valves connected to alternate phases of both said supply and load circuits.

CLODIUS H. WILLIS.